March 16, 1943. C. W. OTIS Re. 22,289
DISPLAY
Original Filed Nov. 27, 1935
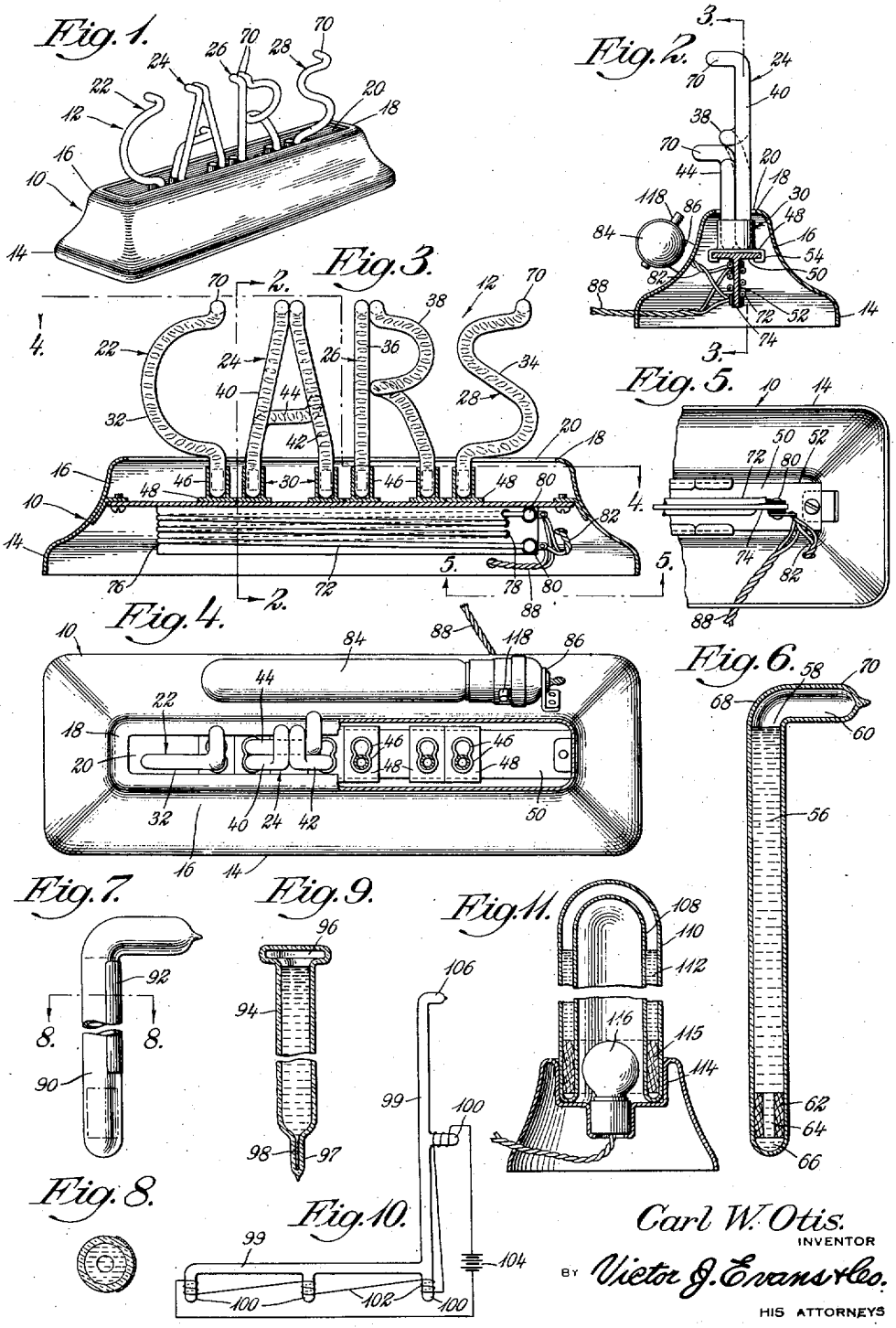
Carl W. Otis.
INVENTOR
BY Victor J. Evans & Co.
HIS ATTORNEYS Reissued Mar. 16, 1943

Re. 22,289

UNITED STATES PATENT OFFICE 22,289

DISPLAY

Carl W. Otis, Menands, N. Y.

Original No. 2,174,446, dated September 26, 1939, Serial No. 51,952, November 27, 1935. Application for reissue September 5, 1941, Serial No. 409,754

8 Claims. (Cl. 40—130)

My invention relates to displaying devices, and has among its objects and advantages the provision of an improved bubbling fluid sign.

In the accompanying drawing:

Fig. 1 is a perspective view of a sign embodying the invention;

Fig. 2 is a sectional view taken along the line 2—2 of Fig. 3;

Fig. 3 is a longitudinal sectional view taken along the line 3—3 of Fig. 2;

Fig. 4 is a sectional view along the line 4—4 of Fig. 3;

Fig. 5 is a fragmentary view taken from the position indicated by line 5—5 in Fig. 3;

Fig. 6 is a sectional view of one of the tubes;

Fig. 7 is a sectional view of a similar tube provided with a reflector;

Fig. 8 is a sectional view along the line 8—8 of Fig. 7;

Fig. 9 is a sectional view of a different tube;

Fig. 10 is a diagrammatic view of another form of tube construction; and

Fig. 11 is a sectional view of a tube including interior lighting.

In the embodiment selected to illustrate the invention, I make use of a base 10 in the nature of a housing above which the sign 12 projects. In Figs. 2 and 3, the base 10 includes a wide part 14 and a neck 16 terminating in a flat top 18 provided with a slot 20 through which the sign projects.

The reading matter of the sign comprises glass tubes shaped to define the necessary letters of the alphabet. In Figs. 2 and 3, the letters 22, 24, 26, and 28 are illustrated as comprising glass tubes removably inserted in socket assemblies 30. The letters 22 and 28 each comprises a single tube 32 and 34, respectively, while the letter 26 comprises two tubes 36 and 38, and the letter 24, three tubes 40, 42 and 44.

Each socket assembly 30 comprises two sockets 46 mounted upon a plate 48 slidably mounted upon a plate 50 comprising an integral part of the T-bar 52 (see Fig. 2). In the latter view, the plates 48 are illustrated as having two opposite edges bent at 54 to embrace both sides of the marginal edges of the plate 50 for connecting purposes. The plates 48 may be shifted upon the plate 50 to secure precise locations of the sockets 30 for spacing the letters at proper distances.

All the individual tubes such as those illustrated at 32 to 42, inclusive, are hermetically sealed and partly filled with a liquid 56 characterized by a low boiling point, such as wood alcohol or ether. The liquid may be suitably colored. In Fig. 6, I illustrate the level of the liquid 56 at 58. The air is exhausted from the space 60, which space provides accommodation for the expansion of the liquid and a heat dissipating chamber.

Within the lower end of the tube I place a wood plug 62 having a central bore 64. The plug 62 fits tightly within the tube and is arranged in spaced relation with the bottom of the tube, as indicated at 66. The upper end of the tube is bent at 68 to provide a right angular reach 70. All the tubes are provided with the right angular reach 70.

Means for heating the liquid in the letters of the sign 12 comprises an asbestos covered wire 72 attached to the flange 74 of the T-bar 52. One end of the flange is notched at 76 for the reception of the wire 72, while openings 78 are provided in the flange near its opposite end through which the wire is threaded. The two ends of the wire are electrically connected at 80 with wires 82 which may be connected with a suitable source of electric energy.

When the wire 72 is energized, the lower ends of the tubes comprising the letters of the sign 12 are heated which causes liquid in the tubes to be heated to the boiling point. Bubbles generated because of the boiling liquid move upwardly through the liquid to be condensed in the upper part of the tubes. The space 60 illustrated in Fig. 2 aids in the conversion of the vapors to their liquid state, which converted vapor is accumulated in the liquid 56.

An important feature of my invention resides in the provision of the plug 62. Because of the liquid in the pores of the wood adjacent the glass wall of the tube, the liquid is quickly converted into a vaporous state. After the plug 62 has reached a predetermined temperature, additional bubbles will be formed because of the heated plug. Large bubbles are formed within the bore of the plug. I have found that the incorporation of the plug 62 provides a construction in which effective bubbling is attained without the necessity of enlarging the lower end of the tube into the form of a bulb. This feature eliminates the necessity for difficult and expensive formations.

In the cold condition of the liquid, the level in the tube is below the bend 68. The space 60 provides accommodation for expansion incident to boiling. In my construction, expanded liquid flows into the horizontal reach 70. Since the tubes cannot be completely filled with liquid, it is necessary to provide a certain amount of space at their upper ends. In an unbent tube the empty space is visible under boiling conditions, which tends to impair the ornamental appearance of the sign.

In my construction, all portions of the tube defining the contour of the letters are completely filled with liquid. Thus, the horizontal reaches 70 provide an overflow reservoir, in addition to heat dissipating chambers to the end that the letters are complete. In many cases it is difficult to determine the exact amount of liquid which should be placed in the tubes. My angular reach 70 compensates for variations in the volume of the liquid so that no harm is done if too much liquid is placed in a tube. All that is necessary is to place a sufficient quantity of liquid in the tube.

Figs. 1 and 3 illustrate the significance of the angular reaches 70. These reaches extend backwardly from the reading face of the sign and are not generally visible. In Fig. 2, I illustrate a bulb 84 as being mounted to the base 10 through the medium of a bracket 86. This bulb illuminates the liquid in the tubes so as to increase their visibility and pictorial aspects.

In Figs. 2 and 3, I illustrate the novelty of my socket assemblies 30. The tubes 40 and 44 are carried by the sockets 46 of one tube assembly 30, while the tube 42 is carried by one of the sockets 46 in a second socket assembly 30. The tube 42 is positioned behind the tube 40 and extends horizontally between the tubes 40 and 42. The horizontal part of the tube inclines slightly, which is necessary to permit the bubbles to travel through the liquid body. The inclination is not sufficient to mar the structural balance of the letter.

Because of the slidable nature of the socket assemblies 30, and the fact that each socket assembly includes two sockets, all letters of the alphabet may be formed and the socket assemblies are adjustable to accommodate letters or other designs of various sizes and shapes. In Figs. 2 and 3, I illustrate the lamp 84 as being electrically connected with the terminals 80 through the medium of wires 88.

In Fig. 7, I illustrate a tube 90 provided with a silvered area 92 extending about a portion of the exterior thereof. All the tubes in a sign such as that illustrated at 12 may be provided with reflectors, whereby I eliminate the necessity for an illuminating bulb in locations where the street lighting is of sufficient intensity to provide the necessary degree of illumination.

Fig. 9 illustrates a tube 94 having its upper end tooled to provide a chamber 96. This chamber corresponds to the angular reach 70 for functional purposes. I distort the lower end of the tube 94 at 97 to provide a narrow passage 98 for the reception of the liquid in the tube, which passage functions to cause quick boiling. In Fig. 10, I illustrate a tubular structure suitable for defining borders and ornamental configurations other than reading matter. The tubular structure comprises two reaches 99 arranged at an angle to each other and provided with short tubular extensions 100 projecting laterally therefrom.

The extensions 100 are provided with plugs corresponding to the plug 62. A heating wire 102 is wrapped about the extensions 100 and connected with a suitable source of current 104. I illustrate the vertical reach 99 as being provided with an angular extension 106 corresponding to the reach 70 of Fig. 6. In a construction according to Fig. 10, the extensions 100 are spaced at such intervals as to provide a bubbling action of the liquid throughout the entire length of the design. Obviously, one or more than two reaches 99 may be used. In border designs of the type illustrated, the horizontal reach or reaches will incline slightly to facilitate travel of the bubbles.

Fig. 11 illustrates a tube comprising an inner wall 108 an dan outer wall 110 arranged in spaced relation therewith to provide accommodation for the liquid 112. The lower end of the tube is detachably connected within a socket 114, which socket supports an electric bulb 116 positioned within the inner wall 108 for heating and illuminating the tube. This tube is provided with a displacement plug 115 of the same type as the plug 62, with the exception that it is not bored.

While I have illustrated the tube in Fig. 6 as being provided with a wooden plug, it will be understood that other materials may be employed. Without a plug or equivalent element, the tube is difficult to heat and the high temperature frequently causes the tubes to burst. In Fig. 4, I illustrate the bulb 84 as being provided with a conventional switch 118, which permits the illumination to be controlled independently of the heating facilities.

Without further elaboration, the foregoing will so fully explain my invention that others may, by applying current knowledge, readily adapt the same for use under various conditions of service.

I claim:

1. In a display device, a base, a transparent display tube carried by said base and containing a liquid, a heating device associated with the base for agitating said liquid, and a bored liquid displacing means positioned inside the display tube in close proximity to said heating means.

2. In a display device, a base, a support carried by the base, a plurality of sockets slidably mounted upon said support, and a transparent display tube detachably positioned within each socket, said display tubes containing liquid, and electrically energized heating means wrapped about said support for heating and agitating the liquid in said display tubes.

3. In a display device, a liquid containing display tube of transparent properties, and a wood liquid displacing element positioned inside the tube near one end, to cause rapid boiling of the liquid, the wooden element being shorter than the display tube and fitting snugly therein.

4. In a bubbling sign, an upright double-walled display tube containing liquid between the walls, a porous liquid displacing element positioned between the walls near their lower ends, said liquid displacing element being submerged in the liquid, and heating and illuminating means positioned in heat transfer relation with the lower end of the double-walled display tube, to boil the liquid and illuminate the same.

5. In a device of the type described, a hollow display character, liquid in said display character, means for supporting the display character in an upright position, means for heating the lower end of the display character, and a porous means fitting snugly within the display character in slightly spaced relation with its lower end, to provide a chamber subjacent said last means, to facilitate bubbling of the liquid.

6. In a bubbling device, a pellucid tube containing a vaporizable liquid which is boiled during the operation of said device, said tube including a large reservoir for said liquid and a small reservoir for said liquid disposed wholly below said large reservoir, means to heat the liquid in said small reservoir, and means providing restricted commnuication between said reservoirs, said communicating means being disposed wholly below said large reservoir and wholly above said small reservoir, said communicating means having an open cross-sectional area normal to the direction of the flow of bubbles emanating from said small reservoir when said liquid is boiled, which said cross-sectional area is smaller than the cross-sectional area in said large and said small reservoirs normal to said direction of flow, so that the heat applied to said small reservoir will not be dissipated rapidly enough by circulation of said liquid between said large and said small reservoirs to prevent the liquid in said small reservoir from being brought to its boiling point.

7. In a bubbling device wherein a vaporizable liquid is heated to boil the same, the combination of a transparent container for said liquid adapted to be heated in a localized area, a partition member adjacent said localized area dividing said container into a large compartment and a small compartment which is disposed wholly below said large compartment, said small compartment being in said localized area, said partition member being disposed wholly below said large compartment and wholly above said small compartment and having a passageway providing restricted communication between said compartments, said passageway having an open cross-sectional area normal to the direction of flow of bubbles emanating from said small compartment when said liquid is boiled, which said cross-sectional area is smaller than the open cross-sectional area of said large and small compartments normal to said direction of flow so that the heat applied to said localized area will not be appreciably dissipated by circulation of said liquid between said large and small compartments and the limited quantity of liquid in the small compartment will be quickly raised to its boiling point and bubble through said passageway into the large compartment.

8. In a bubbling device a transparent liquid container adapted to be heated in a localized area, a vaporizable liquid in said container which is boiled during the operation of said device, a partition member adjacent said localized area dividing the container into a large compartment and a small compartment, said small compartment being disposed wholly below said large compartment, said small compartment being in said localized area, said partition member being disposed wholly below said large compartment and wholly above said small compartment and having a passageway providing restricted communication between said compartments, and heating means arranged in heat transfer relationship to said localized area, said passageway having an open cross-sectional area normal to the direction of flow of bubbles emanating from said small compartment when said liquid is boiled, which said cross-sectional area is smaller than the open cross-sectional area of said large and small compartments normal to said direction of flow, so that the heat applied to said localized area will not be appreciably dissipated by circulation of said liquid between said large and small compartments through said passageway, and the limited quantity of liquid in the small compartment will be quickly raised to boiling point and bubble through said passageway into the large compartment.

CARL W. OTIS.